Oct. 29, 1935.                G. O. BLAIR                2,019,387
                              LOCK NUT
                          Filed Oct. 30, 1934
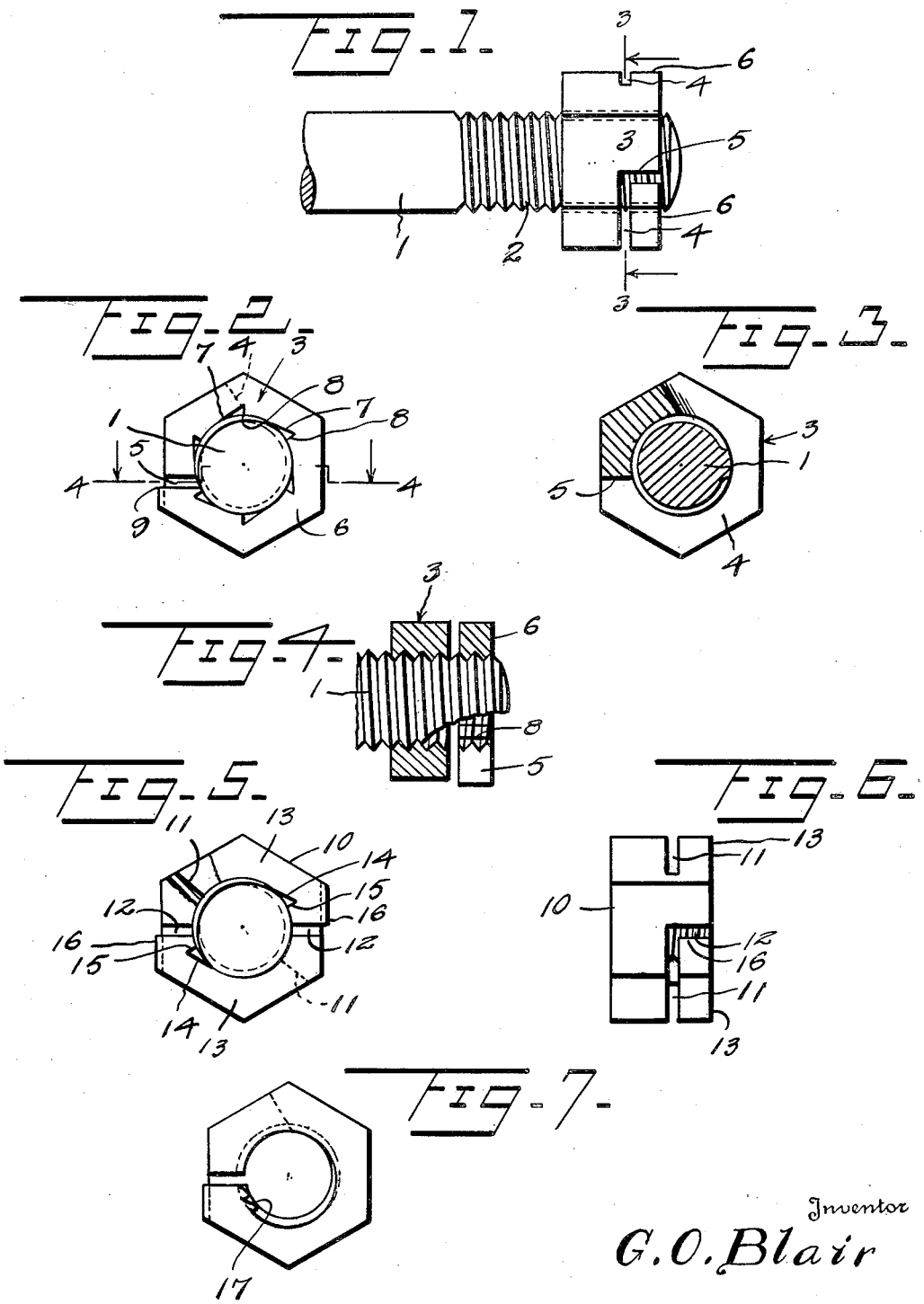
Inventor
G. O. Blair
By Watson E. Coleman
Attorney Patented Oct. 29, 1935

2,019,387

UNITED STATES PATENT OFFICE 2,019,387

LOCK NUT

George O. Blair, Denver, Colo.

Application October 30, 1934, Serial No. 750,691

2 Claims. (Cl. 151—21)

This invention relates to improvements in lock nuts and pertains particularly to a nut having a portion integral therewith by which the locking action is obtained.

The primary object of the present invention is to provide a novel and improved form of lock nut wherein the locking element constitutes an integral part of the lock body and is formed by a novel cutting of a portion of the body.

A further object of the invention is to provide a lock nut which may be readily threaded onto any usual type of bolt but which is so designed that any tendency of the nut to rotate in a reverse direction will be resisted or opposed by an integral part of the nut body.

A still further object of the invention is to provide a lock nut having a novel releasing means whereby release of the nut may be effected by the tool applied to the nut for the purpose of unscrewing the same from the bolt to which it is applied.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in elevation of a portion of a bolt showing thereon one form of a nut constructed in accordance with the present invention.

Figure 2 is a view in end elevation of the bolt and the nut.

Figure 3 is a section on the line 3—3 of Figure 1.

Figure 4 is a section on the line 4—4 of Figure 2.

Fig. 5 is a view in end elevation of a bolt showing a modified form of nut thereon.

Figure 6 is a view in side elevation of the modified nut.

Figure 7 is a view showing a modified form of the bolt engaging teeth.

Referring to the drawing wherein like numerals of reference designate corresponding parts throughout the several views, the numeral 1 indicates a portion of a bolt having a threaded end 2 upon which one form of the nut embodying the present invention is shown applied, the nut being indicated as a whole by the numeral 3. In carrying out the invention, the body of the nut 3 is provided adjacent one end with a slot 4 which is formed transversely of the axis of the nut and which extends, preferably, beyond the axial center from the side from which the cut is started. There is then formed the longitudinally extending or cross cut 5 from the end of the nut nearest the cut 4 downwardly to this cut so as to form the tongue 6 which is free at one end and integrally connected at its other end with the body of the nut.

The inner surface of the tongue portion 6 and the part of the nut body which lies in the same plane with the tongue 6, are provided with the kerfs 7 which extend transversely of the threads of the nut and form the teeth 8 which oppose the threads 2 of the bolt when the nut is in position thereon.

As will be noted, the free end of the tongue 6 is of a thickness from the inner to the outer sides of the nut body greater than the remaining portion of the nut body so that there is formed the extension 9 which serves as a means for releasing the hold of the tongue upon the bolt 1 when it is desired to remove the nut from the bolt. It will be readily apparent that when a wrench is applied to the nut it may be brought into abutting engagement with the extended end 9 of the tongue so that when power is applied to turn the nut it will oscillate slightly and push against the free end of the tongue and thus cause the same to swing outwardly away from the bolt so that the teeth 8 will not interfere with the removal of the nut therefrom. By causing the tongue 6 to be sprung inwardly slightly toward the axial center of the nut, it will be readily apparent that it will constantly maintain frictional contact with the bolt and any tendency of the nut to reversely rotate on the bolt will be opposed by the teeth 8 which will tend to bite into the surface of the bolt with which they are in contact.

In Figures 5 and 6 there is shown a modified form of the invention as illustrated in Figure 1. In this form the nut body, which is indicated by the numeral 10, is provided with two transverse slots formed from opposite sides of the bolt and indicated by the numeral 11. The end of the bolt nearest the slots is then provided with the longitudinally extending cuts 12 which are at right angles to the slots 11 and each of these cuts enters one of the slots, the opposite end of the slot terminating short of the other longitudinal cut so that there is thus formed the two substantially semi-circular tongues 13 instead of the single one indicated in Figure 1 by the numeral 6. The inner surfaces of these tongues are likewise provided with the transverse kerfs 14 for the formation of toothpoints 15 which engage the body of the bolt upon which the nut is mounted. Also each of these semi-circular tongues is formed to project slightly at each of its free ends beyond the adjacent face of the nut so as to form the release point or extension 16. By engaging and pulling outwardly upon these extended release points, the tongues may be readily freed from the bolt so that the nut can be conveniently removed.

It will be readily apparent that instead of forming the relatively widely spaced kerfs shown in Figures 1 and 5 and indicated by the numerals 7 and 14, the inner faces of the tongues 6 and 13 may be cut to form the closely spaced sharp teeth illustrated in Figure 7 and indicated by the numeral 17.

From the foregoing, it will be readily apparent that the nut herein described may be easily and economically manufactured and it will also be readily apparent that the structure is such that the accidental loosening of the nut will not occur so that after the nut has been placed in operative position, it will maintain this position until the tongues have been released.

What is claimed is:—

1. In a lock nut, a nut body, a tongue forming an integral part of the nut body and arranged to surround and engage a bolt upon which the nut is mounted, means integral with the tongue for engaging the bolt to prevent turning of the nut in one direction thereon, and means integral with the tongue for facilitating its release from the bolt.

2. A lock nut, comprising a nut body having a slot cut thereinto from one side and at right angles to the axis of the nut and a slot cut longitudinally of the nut from one end and entering the first slot whereby a tongue is formed which is free at one end, the tongue being designed to frictionally engage a bolt upon which the nut is mounted, and means facilitating the freeing of the tongue from the bolt comprising an extension of a portion of the tongue beyond a face of the nut.

GEORGE O. BLAIR.